United States Patent [19]

Boyesen

[11] Patent Number: 4,909,193
[45] Date of Patent: Mar. 20, 1990

[54] EXHAUST CONTROL VALVE FOR FUEL INJECTED TWO-STROKE CYCLE ENGINES AND PROCESS FOR USING SAME

[75] Inventor: Eyvind Boyesen, Kempton, Pa.

[73] Assignee: Performance Industries, Inc., Kempton, Pa.

[21] Appl. No.: 351,645

[22] Filed: May 15, 1989

Related U.S. Application Data

[63] Continuation-in-part of Ser. No. 96,551, Sep. 15, 1987, Pat. No. 4,829,946.

[30] Foreign Application Priority Data

Sep. 14, 1988 [CA] Canada ................. 577,388

[51] Int. Cl.⁴ ........................................... F02B 75/02
[52] U.S. Cl. .............................. 123/65 PE; 123/323
[58] Field of Search .............. 123/65 PE, 65 A, 65 V, 123/65 P, 323, 340

[56] References Cited

U.S. PATENT DOCUMENTS

| | | | |
|---|---|---|---|
| 1,514,476 | 11/1924 | Still .................. | 123/65 PE |
| 4,121,552 | 10/1978 | Mithuo et al. .......... | 123/65 PE |
| 4,285,311 | 8/1981 | Iio ..................... | 123/323 |
| 4,321,893 | 3/1982 | Yamamoto ............ | 123/65 PE |
| 4,325,335 | 4/1982 | Shibata ............... | 123/323 |
| 4,364,346 | 12/1982 | Shiohara ............. | 123/323 |
| 4,391,234 | 7/1983 | Holzleitner .......... | 123/65 V |
| 4,399,788 | 8/1983 | Bostelmann .......... | 123/323 |
| 4,446,833 | 5/1984 | Matsushita et al. ... | 123/435 |
| 4,672,924 | 6/1987 | Hiasa et al. .......... | 123/65 PE |
| 4,672,925 | 6/1987 | Miyata et al. ........ | 123/65 PE |

FOREIGN PATENT DOCUMENTS

| | | |
|---|---|---|
| 62-49445 | 10/1987 | Japan . |
| 62-243923 | 10/1987 | Japan . |
| 62-67523 | 11/1987 | Japan . |
| 62-176437 | 11/1987 | Japan . |
| 62-267522 | 11/1987 | Japan . |
| 62-271925 | 11/1987 | Japan . |
| 62-271926 | 11/1987 | Japan . |
| 62-271927 | 11/1987 | Japan . |
| 63-21319 | 1/1988 | Japan . |
| 63-38610 | 2/1988 | Japan . |
| 63-78132 | 5/1988 | Japan . |
| 63-30485 | 6/1988 | Japan . |
| 63-115530 | 7/1988 | Japan . |
| 63-192913 | 8/1988 | Japan . |
| 63-151936 | 10/1988 | Japan . |
| 63-248913 | 10/1988 | Japan . |
| 64-15425 | 1/1989 | Japan . |
| 64-19117 | 1/1989 | Japan . |
| 64-51730 | 3/1989 | Japan . |
| 64-83818 | 3/1989 | Japan . |

OTHER PUBLICATIONS

The High-Speed Two-Stroke Petrol Engine, Philip H. Smith, pp.-106-113, 125, published by Autobooks, Burbank, Calif., Feb. 1965.

Primary Examiner—David A. Okonsky
Attorney, Agent, or Firm—Ferrill and Logan

[57] ABSTRACT

An exhaust control valve for two-stroke cycle engines used in conjunction with a fuel injection system is disclosed. This valve is within the exhaust passage and, for each revolution of the engine, delays opening of the exhaust passage to the combustion chamber during the expansion stroke of the piston for a preselected number of degrees of rotation of the crankshaft while permitting the necessary opening of the exhaust port to give complete blow down before the scavenging cycle. The valve also permits advanced closing of the exhaust port to eliminate short circuiting of the fresh charge out the exhaust port. A fuel injection system, providing fuel either upstream or downstream from valves in the engine's air intake passage, is provided to operate in timed relation to the piston strokes and the exhaust valve. Also disclosed are means for modifying opening of the exhaust valve at high engine speeds to improve scavenging.

20 Claims, 8 Drawing Sheets

EXHAUST CONTROL VALVE FOR FUEL INJECTED TWO-STROKE CYCLE ENGINES AND PROCESS FOR USING SAME

BACKGROUND OF THE INVENTION

This application is a continuation-in-part of my copending application Ser. No. 096,551, filed Sept. 15, 1987, and now U.S. Pat. No. 4,829,946.

1. Field of the Invention

The present invention relates to new and useful improvements in fuel injected two-stroke cycle gasoline engines. More particularly, the present invention relates to new and useful improvements in exhaust valves for such engines which will delay the opening of the exhaust port every cycle during the expansion stroke and, if desired, advance closing of the exhaust port every cycle during the compression stroke while, at the same time, opening the exhaust port permitting proper scavenging of the cylinder. In addition, the present invention also permits varying the opening and closing of the exhaust port relative to the piston position according to engine speed.

2. Description of the Prior Art

It has been know in the past to provide speed-controlled exhaust valves which will remain partially closed at slow speeds of the engine, delaying communication between the combustion chamber and exhaust passage beyond the usual opening of the exhaust port by the piston, and move upward, fully exposing the exhaust passage to the combustion chamber through the exhaust port at high engine speeds. Such valves, however, do not provide the advantages of longer expansion and compression strokes while also permitting maximum scavenging.

With the foregoing in mind, a principal object of the present invention is to provide a novel exhaust control valve for fuel injected two-stroke cycle engines which will vary the exhaust opening according to a selected pattern during each stroke of the piston.

An additional object of the present invention is to provide an engine with an improved use of fuel, an improved power stroke, and improved emissions results.

Another object of the present invention is to provide a novel exhaust control valve for fuel injected two-stroke cycle engines which, in addition to varying the exhaust opening during each cycle, will further change the exhaust opening with changes of engine speed.

A further object of the present invention is to provide a novel reciprocating exhaust control valve driven in timed relation to the piston movement to delay opening of the exhaust passage during each expansion stroke and advance closing of the exhaust passage during each compression stroke, while opening the exhaust passage sufficiently to permit proper scavenging.

Still a further object of the present invention is to provide a novel exhaust control valve for fuel injected two-stroke cycle engines which may be easily incorporated into an engine and will operate reliably and efficiently.

SUMMARY OF THE INVENTION

An exhaust control valve for fuel injected two-stroke cycle engines is provided within the exhaust passage of the engine positioned in close proximity to the piston skirt. The valve is interconnected with the engine crankshaft and reciprocates upward and downward in timed relation to the piston movement to delay opening of the exhaust passage during the expansion stroke of the piston and advance closing of the exhaust passage during the compression stroke of the piston. After the exhaust passage is initially opened, the valve is moved upward out of the stream of exhaust gases passing through the exhaust port, opening the exhaust port, so as not to interfere with scavenging of the combustion chamber. In addition, an adjustable drive connection is provided between the crankshaft and the valve to permit modification of the position of the valve relative to the piston with a change in engine speed and also to permit modification of the total movement of the valve relative to the piston with change in engine speed and throttle setting.

The fuel injection system operates continuously or in timed relationship with the movement of the piston and the concurrent movement of the exhaust valve. In the preferred embodiment the fuel is delivered into the air intake passage of the engine either upstream or downstream from air intake valves, such as reed valves. The entire system provides the improved fuel control of a fuel injection system with the improved combustion and scavenging of the exhaust valve of the present invention.

DESCRIPTION OF THE DRAWINGS

The operation of the present invention should become apparent from the following description when considered in conjunction with the accompanying drawings, in which.

DETAILED DESCRIPTION OF THE PREFERRED EMBODIMENT

Figure 1:
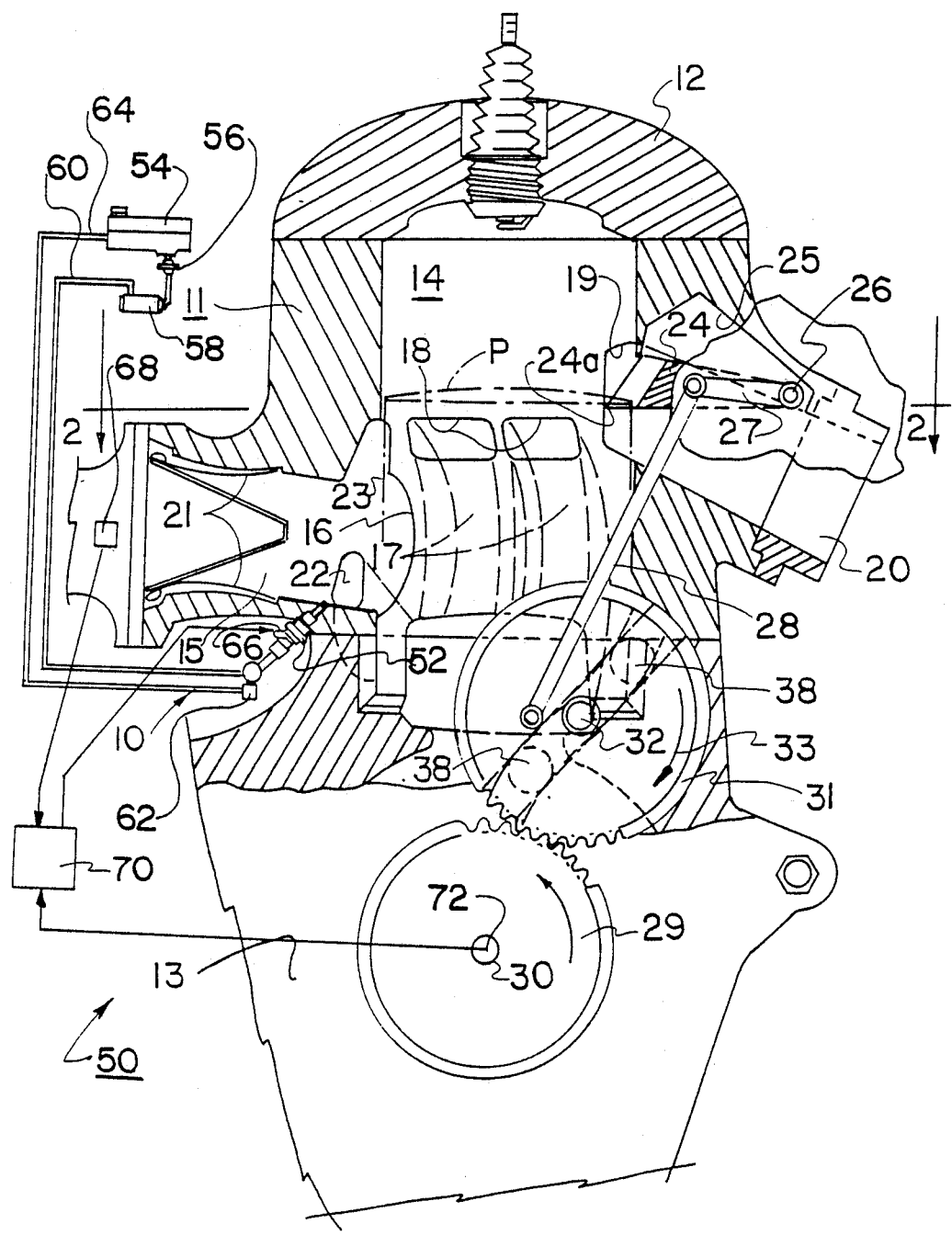
FIG. 1 is a longitudinal sectional view, partially in elevation, of a fuel injected two-stroke cycle engine incorporating the present invention, with the fuel provided downstream of the reed valves in the engine's inlet passage.

In the illustrated embodiment of the present invention, the exhaust control valve is shown in conjunction with a single cylinder fuel injected two-stroke cycle, variable speed, crankcase compression engine as used, for example, on motorcycles. This exhaust control valve, however, has many useful applications in other than the engine shown.

The engine 10 includes a cylinder 11, a cylinder head 12 and a crankcase housing 13, with the piston, connecting rod and crankshaft not shown. The cylinder 11 includes a combustion chamber 14, an inlet passage 15 terminating in the inlet port 16, transfer passages 17, 17 terminating in transfer ports 18, 18 and an exhaust port 19 leading to the exhaust passage 20. In the inlet there are reed valves 21, a supplement transfer passage 22 and a booster port 23, similar to those described in my prior U.S. Pat. No. 3,905,341.

In this type of engine, the piston skirt, not shown, serves as the valve means for opening and closing the inlet port 16, booster port 23, transfer ports 18 and exhaust port 19. In the conventional engine of this type, as the piston is moving toward its bottom dead center position, the upper edge of the piston starts to open the exhaust port 19 at about the 90° position of the crankshaft, 0° being the crankshaft position at top dead center and 180° being the crankshaft position at bottom dead center. Upon continued further downward movement of the piston, the transfer ports and booster port start to open at approximately the 120° position of the crankshaft. When the piston reaches bottom dead center, all of these above ports are fully uncovered or open. Similarly, on the compression stroke of the piston, the transfer and booster ports are closed by the piston at the 240° position of the crankshaft and the exhaust port is closed by the piston at the 270° position of the crankshaft. Thus, in the conventional engine of this type, the effective expansion stroke of the piston and the effective compression stroke of the piston each occur during only a 90° rotation of the crankshaft.

In accordance with the present invention, valve means are provided to delay fluid communication between the combustion chamber 14 and the exhaust passage 20 during the expansion stroke until after the piston has initially uncovered the upper edge of the exhaust port, but permit such fluid communication prior to the transfer ports being opened. Similarly, this same valve means can shut off fluid communication between the combustion chamber and the exhaust passage prior to the piston closing of the exhaust port. This increases the effective length of the expansion and compression strokes, thereby increasing the power output of the engine.

Figure 2:
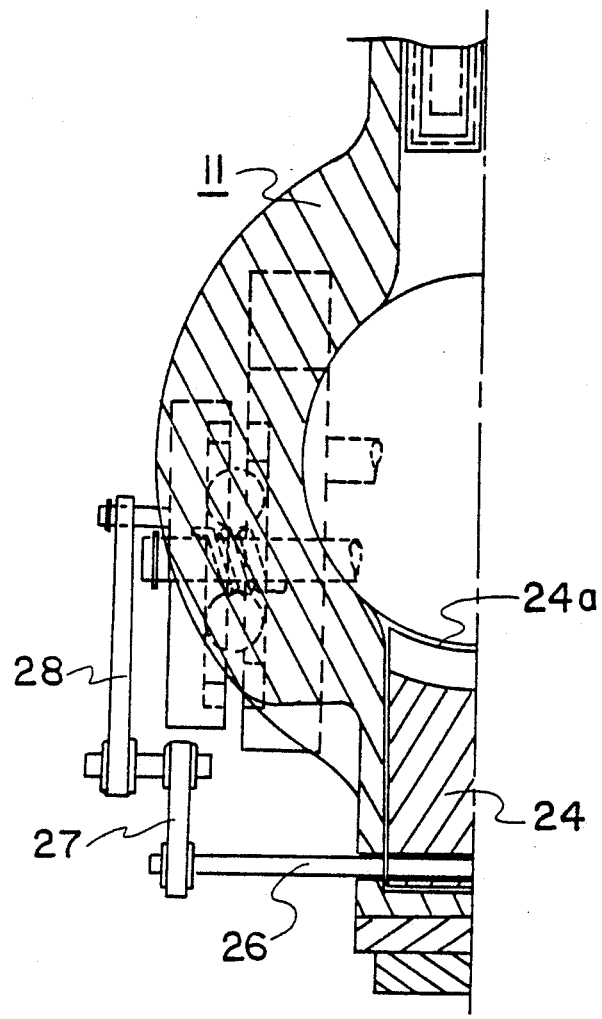
FIG. 2 is a transverse sectional view taken along the line 2—2 of FIG. 1.

In the embodiment of the invention shown, this valve means comprises a flat valve plate 24 pivotally mounted at one end within a recess 25 in the exhaust passage 20. This mounting is accomplished by means of a pivotal valve shaft 26 fixed to and rotatable with valve plate 24 and extending through bushings, not shown, mounted in the cylinder 11 at both sides of exhaust passage recess 25. The valve plate 24 extends forwardly from the valve shaft 26 and terminates near the exhaust port 19. When closing at or just short of the exhaust port 19, the forward edge 24a of the valve plate 24 is concave when viewed from above, as in FIG. 2, and has a radius of curvature equal to or slightly greater than that of the combustion chamber. This forward edge of the valve plate may also be tapered or curved upward or rearward so that it can rest in the exhaust passage recess 25.

An important feature of the present invention is the provision of means to move the valve plate 24 in timed relation to movement of the piston. In the position as shown in FIG. 1, the valve plate 24 is between the top of the exhaust port 19 and the top of the transfer ports 18, and upon rotation of the crankshaft, will move upward. The upper edge of the downward moving piston is, as shown in phantom lines at P, at a position just about passing the upward moving valve plate. This would be, in the embodiment shown, at about the 105 to 110°-125° position of the crankshaft depending on engine revolutions per minute (r.p.m.) and throttle position. In the illustrated position of the piston and valve plate, a seal is provided between the skirt of the piston and the forward edge of the valve plate, preventing the expanding products of combustion in the combustion chamber from entering the exhaust passage 20. While the upper portion of the exhaust port 19 is uncovered by the piston P, the expanding gases in the combustion chamber cannot enter the exhaust passage due to the fact that the valve plate provides a barrier, with possibly slight leakage, between the area of the combustion chamber 14 above the piston and the exhaust passage 20. With this arrangement, the effective expansion force on the piston is extended from 90° rotation of the crankshaft to approximately 105 to 110-125° rotation of the crankshaft. This increases the length of the power stroke of the piston by more than twenty percent. Although a seal is not possible when the exhaust valve is located further downstream in the exhaust port, beneficial results are still obtained by impeding the flow of combustion products and causing a high temperature stream of exhaust upon the opening of the valve. This is believed to provide better operation of air pollution devices, such as catalytic converters, in their normal orientation.

Movement of the valve plate 24 is controlled by rotation of the crankshaft of the engine. To this end, the valve shaft 26 is fixed to the valve plate 24 and extends, at one end, outwardly beyond the cylinder 11. An operating link 27 is attached to the valve shaft and, by means of a connecting link 28, is interconnected with the crankshaft of the engine.

As illustrated, a pinion 29 is carried by an extension 30 of the engine crankshaft. This pinion in turn drives a gear 31 in a one-to-one relationship, which gear is carried by a shaft 32. At the end of the shaft 32 is a rotatable drive plate 33 to which the lower end of the connecting link 28 is attached. A drive connection, more fully described hereafter, is provided between the gear 31 and the drive plate 33 to cause the plate 33 to rotate with the gear 31. Thus, the valve plate 24 is driven from the crankshaft of the engine in timed relation to movement of the piston.

During downward movement of the piston, the valve plate 24 is moving upward as shown in FIG. 1. When the forward edge 24a of the valve plate is higher than the upper edge of the piston, products of combustion may exit from the combustion chamber into the exhaust passage. With continued rotation of the crankshaft, the valve plate continues rising until it is completely within the exhaust passage recess 25, thereby permitting unrestricted flow of exhaust gases through the exhaust passage.

Figure 4:
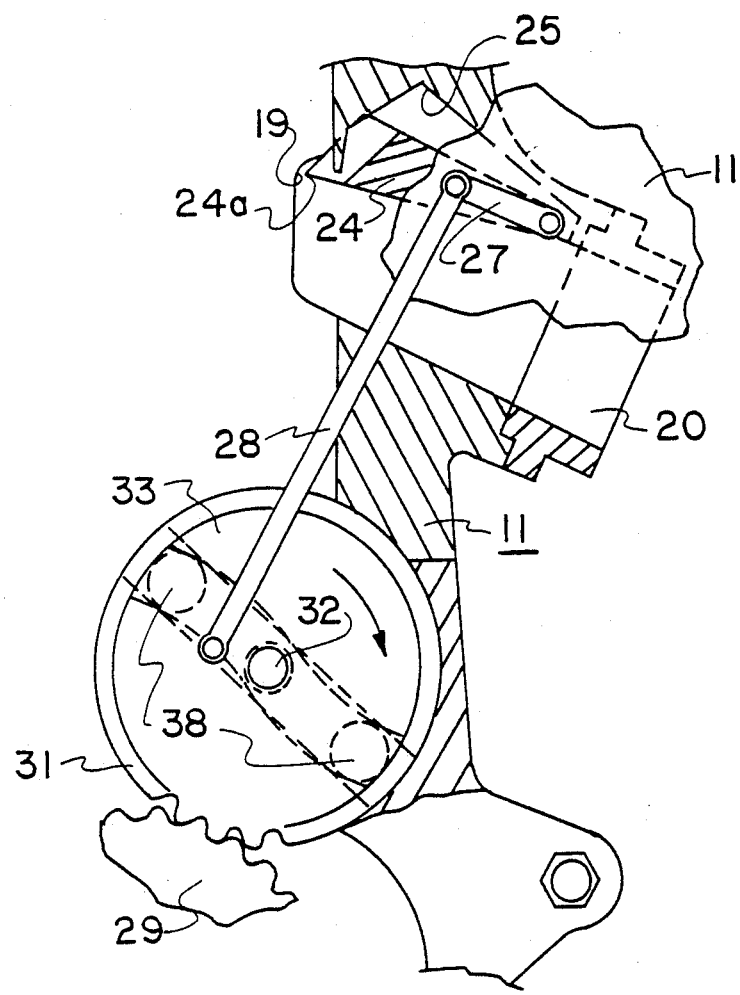
FIG. 4 is a representation of the exhaust control valve drive mechanism at high speed of the engine.
Figure 5:
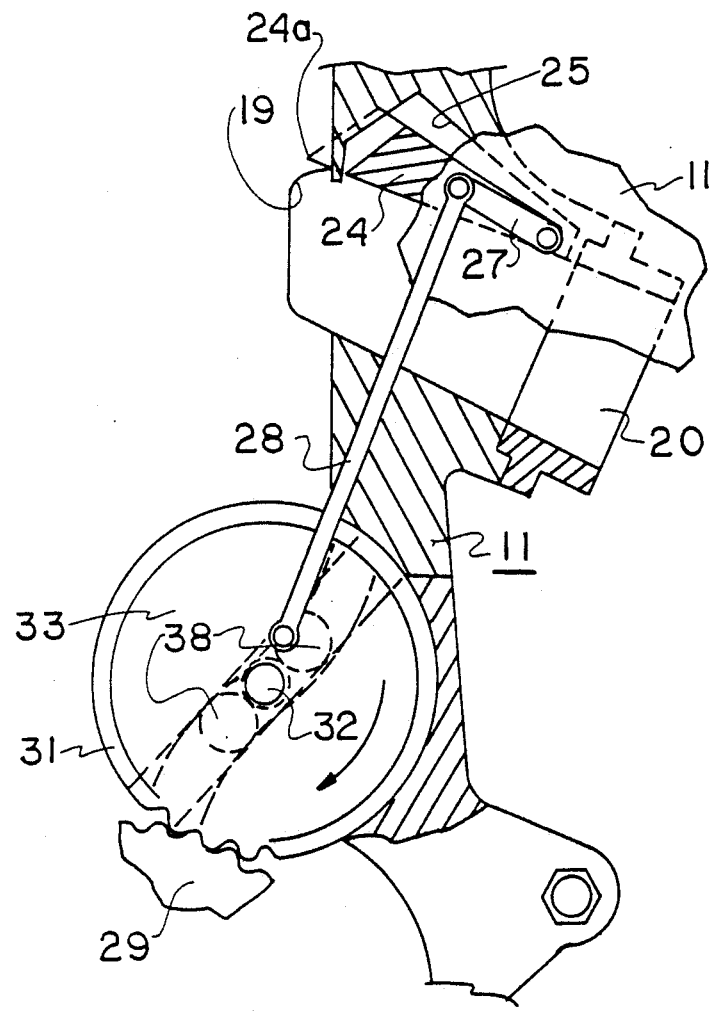
FIG. 5 is a representation of the exhaust control valve drive mechanism at slower speeds of the engine.
Figure 6:
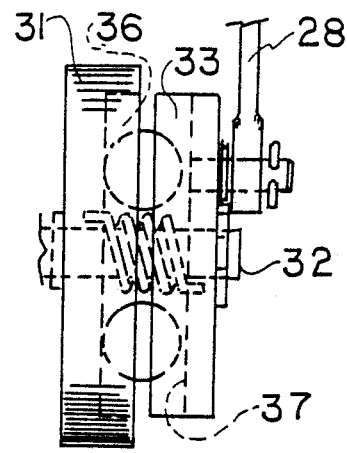
FIG. 6 is a side elevational view of the exhaust control valve drive mechanism.
Figure 7:
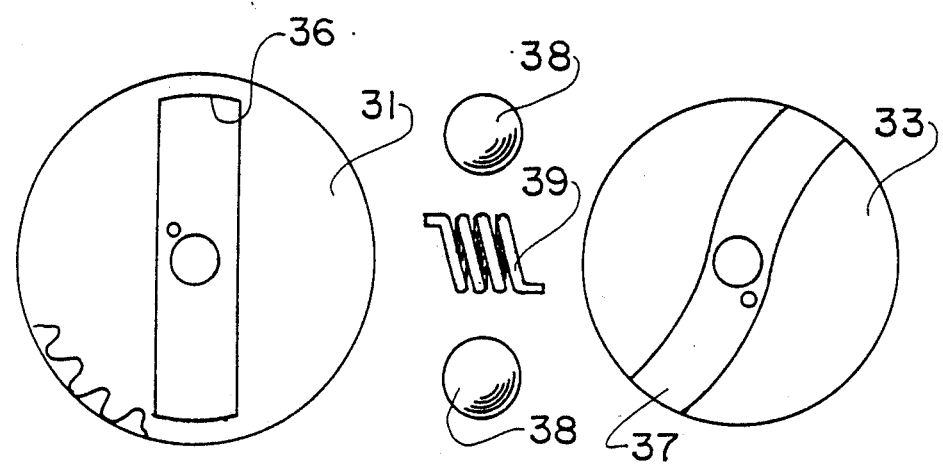
FIG. 7 is an exploded view of the elements of the exhaust control valve drive mechanism.

At high engine speeds, it may be necessary to advance opening of the exhaust passage to allow adequate time for scavenging. One method of advancing opening of the exhaust passage is shown in FIG. 4 through 7, inclusive. As illustrated, the gear 31 is provided with a diametrical recess 36 in the face adjacent the drive plate 33, while the adjacent drive plate face is provided with an S-shaped recess 37. A pair of hardened drive balls 38 ar provided engaged within each recess 36, 37, at opposite sides of the shaft 32 and cause the drive plate 33 to rotate with the gear 31. A torsion spring 39 surrounding the shaft 32 normally urges the drive plate 33 in the counterclockwise direction relative to the gear 31, as viewed in FIG. 5, forcing the balls 38 inwardly toward the shaft 32. When the engine approaches high speed, centrifugal force will drive the balls radially outward against the torsion of the spring 39, rotating the drive plate 33 clockwise relative to the gear 31, as shown in FIG. 4. This will advance upward movement of the valve plate during the expansion stroke of the piston, opening the exhaust passage earlier than at slow or moderate speeds of the engine, allowing more time for scavenging the chamber 14.

Figure 8:
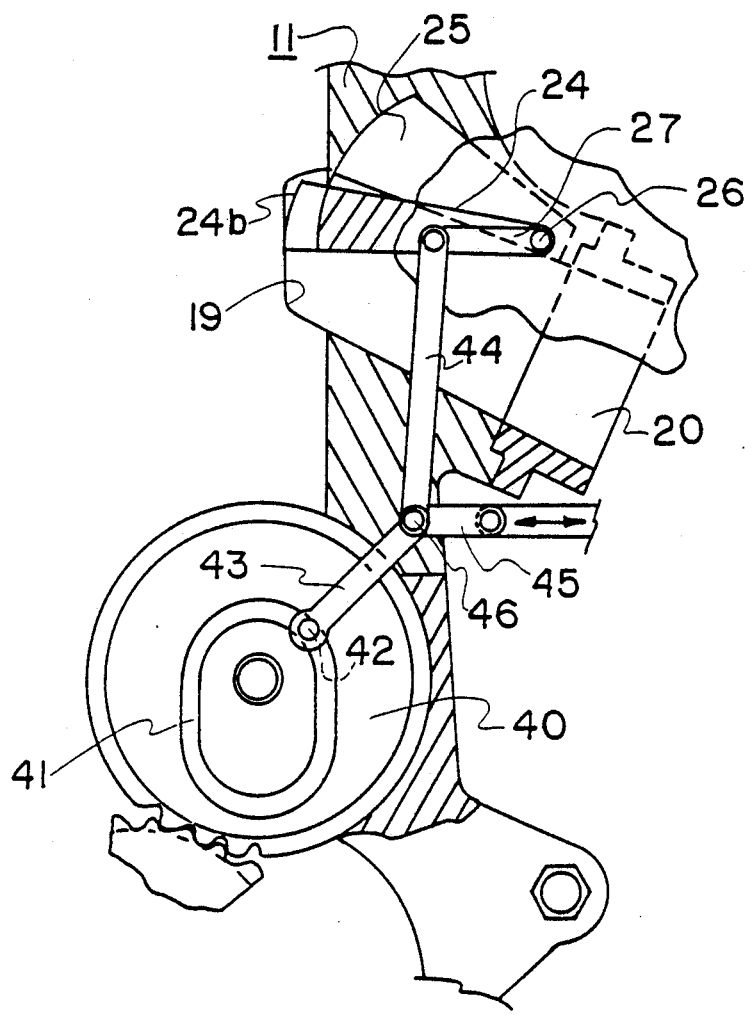
FIG. 8 is a side elevational view of a modified exhaust control valve mechanism.

A modified drive for the valve 24 is illustrated in FIG. 8. In this embodiment, the drive plate also has a concave forward edge 24b but is rounded upward, instead of tapered, to provide constant clearance with the piston over a longer period of relative movement between the piston and valve plate. A rotatable drive plate 40 fixed to the crankshaft or driven by the crankshaft has a cam track recess 41 in its face, within which a cam roller 42, carried by the lower member 43 of a bifurcated linkage 43, 44 is received. The upper link member 44 of the bifurcated linkage is connected to the operating link 27 to cause reciprocation of the valve plate 24 upon rotation of the drive plate 40. An idler link 45 is provided connected to the pivotal connection 46 of the link members 43 and 44. This idler link 45 can be moved horizontally to the right or left, with respect to FIG. 8, in accordance with variations in the engine speed and thus advance opening of the exhaust passage at high engine speed and retard the same at low engine speed.

It also should be appreciated that a cam controlled drive train may be employed in the present invention to control valve element movement. This permits fine-tuning of the valve member movement for each particular engine or each particular use of an engine through merely substituting cams. Additionally, it may be possible in some applications to substitute electronic "cams" which receive electronic signals from the crankshaft and drive a synchronous motor which controls the movement of the valve element.

Figure 3:
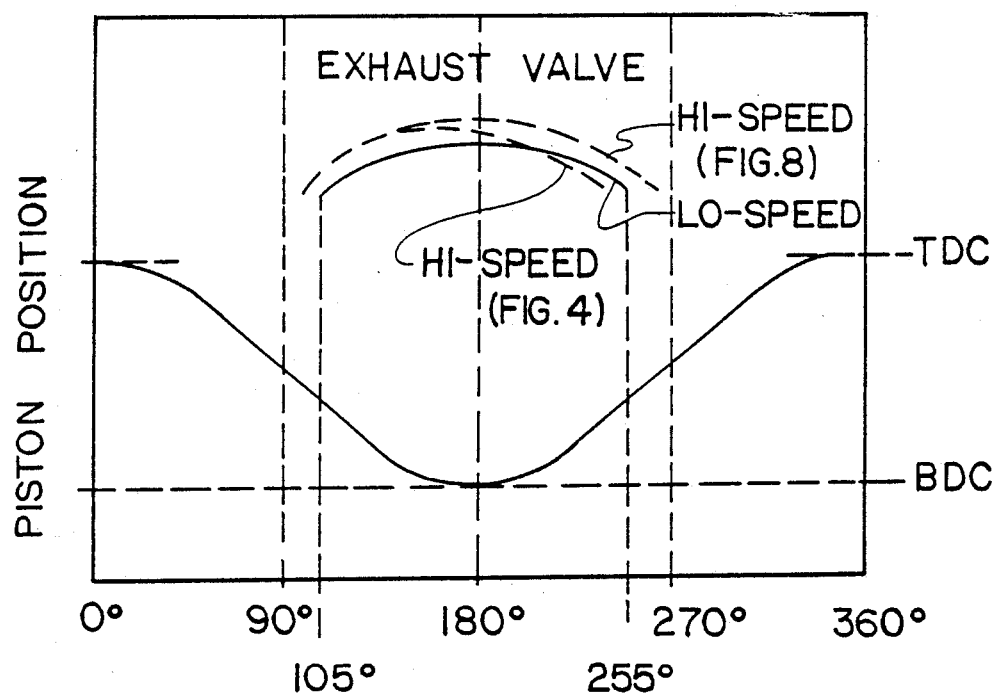
FIG. 3 is a chart showing piston position and exhaust valve position relative to crankshaft rotation.

The chart of FIG. 3 illustrates with the graph A a plot of piston position versus crank angle. Graph B is a plot of the movement of the valve plate during the time the exhaust passage is open to the combustion chamber at low and moderate engine speeds, while graph C is a plot of movement of the valve plate when the exhaust passage is open at high engine speeds and maximum throttle. While plot B shows the exhaust passage being opened at 105° of crank angle and closed at 255° of crank angle at low speed and wide open throttle. There is flexibility in the design, and the exhaust passage can be designed to open anywhere between a 90° and 120° crank angle and close anywhere up to a 270° crank angle.

As is shown in FIG. 1, the exhaust valve of the present invention may be operated with a fuel injection system 50. Any appropriate fuel injection system may function quite well with the present invention. An example of one such system is described in U.S. Pat. No. 4,446,833 issued to Matsushita et al.

The fuel injection system 50 shown in FIG. 1 provides fuel to the air inlet 15 downstream from reed valves 21 via fuel injection nozzle 52. As is known, fuel is pumped to the fuel injection nozzle 52 from a fuel tank 54 and through a fuel filter 56 by a fuel pump 58. Fuel is provided to the nozzle 52 through conduit 60. In order to assure relatively constant fuel pressure, a fuel control valve 62 is provided with a fuel return conduit 64 which returns excess fuel to the fuel tank 54.

The fuel injection nozzle 52 is controlled in the conventional manner by an electromagnetic controller 66 which regulates the amount of fuel released relative to the air flow through the engine. In the preferred embodiment, this control is accomplished through use of a pressure sensor device 68 measuring the pressure in the inlet passage 15, as shown. It also may be placed in a transfer passage 17, or alternatively in the crankcase 13, of the engine. The sensor 68 provides an electrical signal to a central processor 70 which provides a signal conversion. The processor 70 also receives a signal from the crankshaft 36 in angular degrees from a rotational sensor 72. Through use of known control programs, the processor 70 may calculate appropriate fuel discharge parameters relative to the pressure and/or pressure changes in the engine. Fuel discharge commands are then conveyed to the electromagnetic controller 66 to control fuel release by the nozzle 52. As is known, mechanical systems can also be configured to provide similar control of the fuel injection nozzle 52. Also, without departing from the present invention, fuel injector control can be accomplished by the conventional means of measuring the flow of air through the air inlet 15 and providing an appropriate fuel discharge. Also without departing from the present invention, fuel may be injected anywhere in the intake passage, into the crankcase, or into the combustion chamber.

Figure 9:
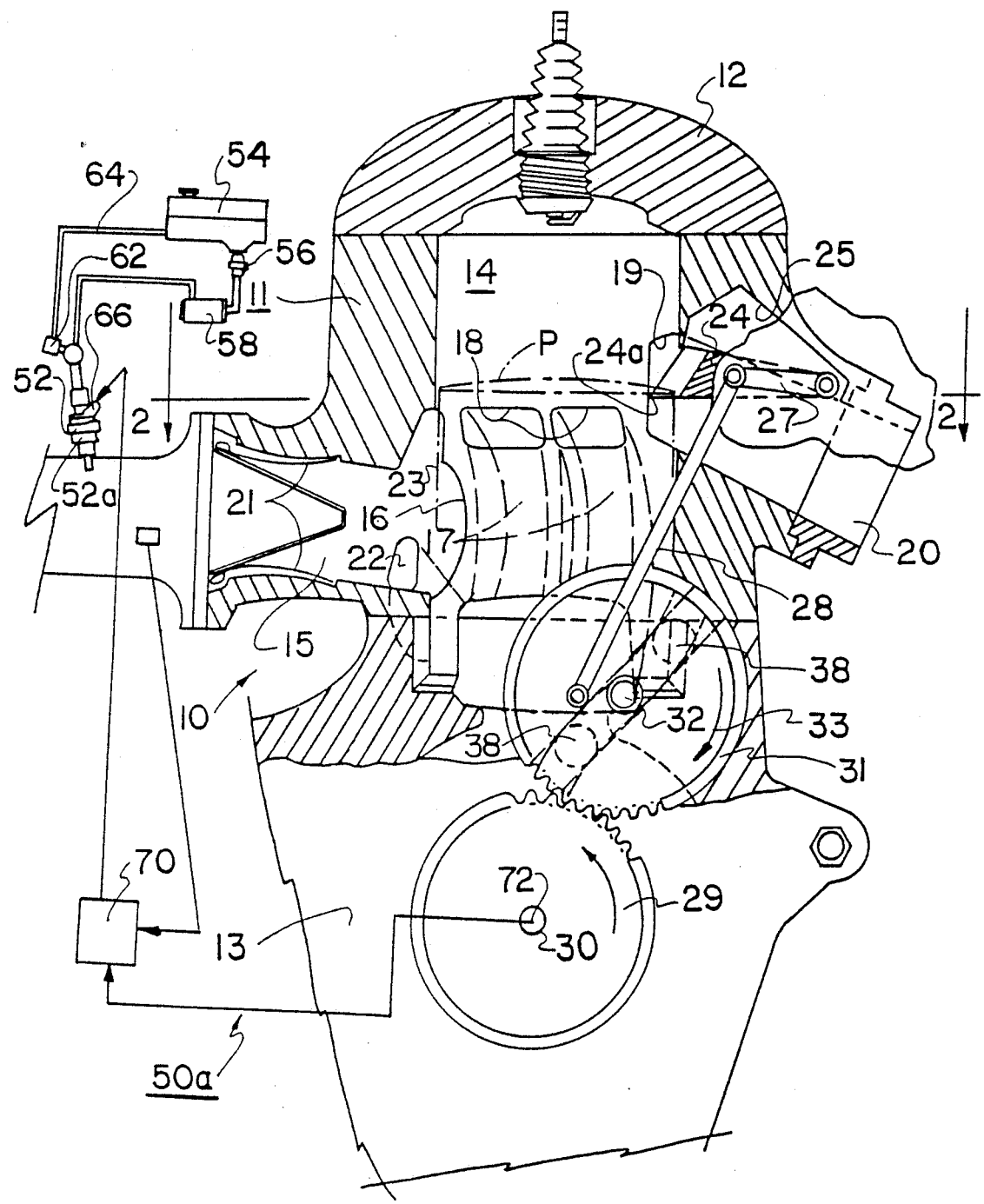
FIG. 9 is a longitudinal sectional view, partially in elevation, of another embodiment of a fuel injected two-stroke cycle engine incorporating the present invention, with the fuel provided upstream of the reed valve in the engine's air inlet passage.

FIG. 9 illustrates another embodiment of the fuel injection system 50 of the present invention which differs from the system 50 of FIG. 1 in the orientation of fuel injection nozzle 52a. As is shown, the fuel injection nozzle 52a may be oriented upstream from the reed valve elements 21. In all other respects this system 50a functions the same as that of fuel injection system 50.

To maximize the effectiveness of the exhaust valve 24 of the present invention, the injection of fuel should occur after the transfer ports 16 have been covered on the upward movement of the piston P. Ideally fuel should be dispensed with the piston at or approaching near top dead center (TDC) position. Fuel may also be dispensed continuously from the fuel injector nozzle throughout the cycle or during other portions of the cycle.

It should be appreciated that the present invention functions equally well when included in known "supercharged " or "blower scavenged" engines which provide fuel and air under pressure from the intake passage, through modified transfer passages, directly to the combustion chamber. However, due to the lower transfer ports of, and the pressure generated by, a high pressure blower scavenged engine, it may be necessary to advance closing of the exhaust valve, perhaps as early as when the piston is at bottom dead center position. Similarly, it may be desirable to open the exhaust passage later. As is true with all embodiments of the present invention, the optimal point of opening or closing of the exhaust valve depends in large part on many factors peculiar to individual engine design. These include the type of charge to the engine, the size of the engine, the scavenging flow, and the configuration and shape of the engine. Additionally, it is believed that it may be desirable to adjust the degree of valve movement with engine speed and throttle opening, with the valve remaining substantially closed at low engine speeds and closed throttle and providing full movement at high speeds and wide open throttle. This may be accomplished in any suitable manner, which may include another mechanism in the linkage between the crankshaft and the valve which controls the extent of valve movement in accordance with engine speed and throttle opening or by switching electronic cams, as discussed, during operation.

While particular embodiments of the present invention have been illustrated and described herein, it should be apparent that changes and modifications may be incorporated and embodied therein within the scope of the following claims.

What is claimed is:

1. A process for operating a two-stroke cycle internal combustion engine having a piston connected to a crankshaft and reciprocating in continuous cycles between the top and bottom of a cylinder, an air intake passage, an exhaust passage, and at least one transfer passage providing compressed air to a combustion chamber above the piston, wherein the process includes the steps of:
   initiating opening of the exhaust passage by the piston at between approximately 105° and 120° of crankshaft rotation from top dead center;
   closing the exhaust passage by the piston at between approximately 240° and 270° of crankshaft rotation from top dead center;
   elevating the upper surface of the effective exhaust passage toward the top of the cylinder after initial opening thereof and before the crankshaft reaches 180° rotation from top dead center; and
   providing fuel to said engine through a fuel injection system.

2. A process in accordance with claim 1 including the step of initiating the opening of the exhaust passage by the piston at an earlier position of rotation of the crankshaft at high engine speeds than at slower engine speeds.

3. A process in accordance with claim 1 including the step of providing fuel through injection into the intake passage of the engine downstream from any intake valving.

4. A process in accordance with claim 1 including the step of providing fuel through injection into the intake passage of the engine upstream from any intake valving.

5. A process in accordance with claim 1 wherein said fuel injection system provides fuel into the intake passage of the engine and including the step of providing an injection of fuel into the intake passage of the engine as the piston approaches substantially top dead center position.

6. A process in accordance with claim 1 wherein said fuel injection system provides fuel into the intake passage of the engine and including the step of providing an injection of fuel into the intake passage of the engine substantially throughout the cycle of the piston.

7. In a two-stroke cycle internal combustion engine having an air intake passage, an exhaust port leading to an exhaust passage, a piston reciprocating in continuous cycles between top and bottom dead center positions in a cylinder, said piston being interconnected with a rotatable crankshaft, and at least one transfer passage providing compressed air and fuel to a combustion chamber above the piston, the improvement comprising
   an adjustable valve member within the exhaust passage adapted to modify the effective size of the exhaust passage;
   actuating means for said valve member to move said valve member from a first position at a location within the exhaust passage closest to the top of the cylinder, and providing the greatest effective size of the exhaust port, to a second position providing a constricted exhaust passage and substantially closing said exhaust passage,
   said actuating means being in timed relation with said crankshaft rotation and piston movement to move said valve member from said second position toward said first position after the upper edge of said piston passes downward below the upper edge of the exhaust port, and to move said valve member from said first position toward said second position after said piston reaches its bottom dead center position; and
   injection means to provide fuel to said engine.

8. Apparatus in accordance with claim 7 including adjustable drive means interconnected with said actuating means to advance movement of said valve member from said second position to said first position with increased speed of rotation of said crankshaft.

9. Apparatus in accordance with claim 7 wherein said valve member reciprocates between said first and said second position.

10. Apparatus in accordance with claim 7 wherein said injection means includes a fuel injection nozzle providing fuel into the intake passage of the engine downstream from any intake valving.

11. Apparatus in accordance with claim 7 wherein said injection means includes a fuel injection nozzle providing fuel into the intake passage of the engine upstream from any intake valving.

12. In a two-stroke cycle internal combustion engine including a cylinder, a combustion chamber in the cylinder, an exhaust port spaced from and below the upper end of the combustion chamber leading to an exhaust passage, and a piston carried within said combustion chamber for reciprocation between top and bottom dead center positions, said piston being interconnected with a rotatable crankshaft and functioning as a valve member to open and close said exhaust port, the improvement which comprises
   a recess provided in said exhaust passage;
   a valve member mounted at least partially within said exhaust passage recess for reciprocal movement between a first position within said recess and a second position intermediate upper and lower edge of said exhaust passage,
   said valve member in its second position intermediate upper and lower edges of said exhaust port providing a restricted fluid flow substantially preventing flow from said combustion chamber through said exhaust passage;
   actuating means interconnected with said valve member and said crankshaft to move said valve member between said first and second positions in timed relation to movement of said piston; and
   injection means to provide fuel to engine.

13. Apparatus in accordance with claim 12 including adjustable drive means interconnected with said actuating means to advance movement of said valve member from said second position to said first position with increased speed of rotation of said crankshaft.

14. Apparatus in accordance with claim 13 in which said adjustable drive means includes means responsive to centrifugal force generated due to rotation of the crankshaft.

15. Apparatus in accordance with claim 12 including means in said recess pivotally mounting said valve member for movement between said first and second positions.

16. Apparatus in accordance with claim 13 wherein said actuating means includes a drive plate rotatably driven from the engine crankshaft, and said adjustable drive means includes means responsive to centrifugal force to modify the angular position of said drive plate with respect to the angular position of said crankshaft.

17. Apparatus in accordance with claim 13 wherein said actuating means includes a cam and cam follower.

18. Apparatus in accordance with claim 12 in which, as said piston is moving toward its bottom dead center position, said actuating means is moving said valve member in the opposite direction toward its said first position.

19. Apparatus in accordance with claim 12 wherein said injection means includes a fuel injection nozzle providing fuel into the intake passage of the engine downstream from any intake valving.

20. Apparatus in accordance with claim 12 wherein said injection means includes a fuel injection nozzle providing fuel into the intake passage of the engine upstream from any intake valving.

* * * * *